United States Patent
Lu et al.

(10) Patent No.: US 10,391,871 B2
(45) Date of Patent: Aug. 27, 2019

(54) CONTROLLING CURRENT FLOW PATH IN WIRELESS ELECTRIC VEHICLE CHARGING SYSTEMS FOR MITIGATING RF RADIATED EMISSIONS

(71) Applicant: WiTricity Corporation, Watertown, MA (US)

(72) Inventors: Lin Lu, San Diego, CA (US); Paul Guckian, San Diego, CA (US); Jagadish Nadakuduti, La Jolla, CA (US)

(73) Assignee: WiTricity Corporation, Watertown, MA (US)

( * ) Notice: Subject to any disclaimer, the term of this patent is extended or adjusted under 35 U.S.C. 154(b) by 325 days.

(21) Appl. No.: 14/489,386

(22) Filed: Sep. 17, 2014

(65) Prior Publication Data

US 2015/0197155 A1   Jul. 16, 2015

Related U.S. Application Data

(60) Provisional application No. 61/926,185, filed on Jan. 10, 2014.

(51) Int. Cl.
  *B60L 11/18*   (2006.01)
  *H02J 50/90*   (2016.01)
  *B60L 53/12*   (2019.01)

(52) U.S. Cl.
  CPC ............ *B60L 11/182* (2013.01); *B60L 53/12* (2019.02); *H02J 50/90* (2016.02); *B60L 2270/147* (2013.01); *Y02T 10/7005* (2013.01); *Y02T 10/7072* (2013.01); *Y02T 90/122* (2013.01); *Y02T 90/14* (2013.01)

(58) Field of Classification Search
  CPC ............................. B60L 11/182; B60L 11/18
  USPC ................................................. 320/108, 137
  See application file for complete search history.

(56) References Cited

U.S. PATENT DOCUMENTS

| | | | |
|---|---|---|---|
| 6,324,430 B1 | 11/2001 | Zarinetchi et al. | |
| 6,850,803 B1 | 2/2005 | Jimenez et al. | |
| 2009/0256429 A1* | 10/2009 | Fan | H02K 53/00 310/25 |
| 2009/0261976 A1* | 10/2009 | Oung | G08B 13/2471 340/572.2 |

(Continued)

*Primary Examiner* — Richard Isla
*Assistant Examiner* — Dung V Bui
(74) *Attorney, Agent, or Firm* — Knobbe, Martens, Olson & Bear, LLP

(57) ABSTRACT

This disclosure provides systems, methods and apparatus for mitigating electromagnetic radiation emissions. In one aspect, a power transfer device of a wireless electric vehicle charging (WEVC) system is provided. The power transfer device includes a ferrite material and at least one electrically conductive coil. The ferrite material and the at least one coil are configured to wirelessly transfer energy either from or to a second power transfer device of the WEVC system. The power transfer device further includes at least one shield comprising a plurality of electrically conducting regions and one or more electrically insulating regions. The plurality of electrically conducting regions and one or more electrically insulating regions are configured to mitigate electromagnetic radiation emissions from the WEVC system that do not contribute to the wireless power transfer between the at least one electrically conductive coil and the second power transfer device.

22 Claims, 15 Drawing Sheets

(56) References Cited

U.S. PATENT DOCUMENTS

| | | | |
|---|---|---|---|
| 2010/0308939 A1* | 12/2010 | Kurs | H02J 5/005 333/219.2 |
| 2011/0050164 A1 | 3/2011 | Partovi et al. | |
| 2011/0282807 A1 | 11/2011 | Colello et al. | |
| 2012/0032595 A1* | 2/2012 | Shim | H05K 9/0054 315/85 |
| 2012/0062175 A1* | 3/2012 | Miller | H02J 50/40 320/108 |
| 2012/0153894 A1* | 6/2012 | Widmer | H04B 5/0037 320/108 |
| 2013/0154553 A1* | 6/2013 | Steele | B60L 11/182 320/108 |
| 2013/0181667 A1* | 7/2013 | Takeshita | B60L 11/182 320/108 |
| 2013/0248311 A1* | 9/2013 | Czainski | B60L 5/005 191/10 |
| 2013/0300359 A1* | 11/2013 | Nakamura | B60L 11/182 320/108 |
| 2014/0361632 A1* | 12/2014 | Obayashi | H01F 27/36 307/104 |
| 2015/0197155 A1* | 7/2015 | Lu | B60L 11/182 320/108 |

* cited by examiner

CONTROLLING CURRENT FLOW PATH IN WIRELESS ELECTRIC VEHICLE CHARGING SYSTEMS FOR MITIGATING RF RADIATED EMISSIONS

RELATED APPLICATION

This application claims the benefit of priority to U.S. Provisional Appl. No. 61/926,185 filed Jan. 10, 2014, and incorporated in its entirety by reference herein.

FIELD

The present disclosure relates generally to wireless power transfer, and more specifically to devices, systems, and methods related to wireless power transfer to remote systems such as vehicles including batteries, and mitigating electromagnetic radiation (e.g., radio-frequency or RF) emissions from such systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a power transfer device of a wireless electric vehicle charging (WEVC) system. The power transfer device comprises a ferrite material and at least one electrically conductive coil. The ferrite material and the at least one coil are configured to wirelessly transfer energy either from or to a second power transfer device of the WEVC system. The power transfer device further comprises at least one shield comprising a plurality of electrically conducting regions and one or more electrically insulating regions. The plurality of electrically conducting regions and the one or more electrically insulating regions are configured to control induced currents in the at least one shield during operation of the WEVC system, the induced currents mitigating electromagnetic radiation emissions from the WEVC system that do not contribute to wireless power transfer between the at least one electrically conductive coil and the second power transfer device.

Another aspect of the disclosure provides a power transfer device of a wireless electric vehicle charging (WEVC) system. The power transfer device comprises means for wirelessly transferring energy either from or to a second power transfer device of the WEVC system. The power transfer device further comprises means for mitigating electromagnetic radiation emissions from the WEVC system that do not contribute to said wirelessly transferring energy. The mitigating means comprises a plurality of electrically conducting regions and one or more electrically insulating regions.

Another aspect of the disclosure provides a method of mitigating electromagnetic radiation emissions from a wireless electric vehicle charging (WEVC) system. The method comprises providing a power transfer device comprising a ferrite material and at least one electrically conductive coil. The ferrite material and the at least one coil are configured to wirelessly transfer energy either from or to a second power transfer device of the WEVC system. The power transfer device further comprises at least one shield. The method further comprises orienting the power transfer device and the second power transfer device relative to one another such that induced currents in the at least one shield mitigate electromagnetic radiation emissions from the WEVC system that do not contribute to wireless power transfer between the at least one electrically conductive coil and the second power transfer device.

Another aspect of the disclosure provides a method of mitigating electromagnetic radiation emissions from a wireless electric vehicle charging (WEVC) system. The method comprises wirelessly transferring energy via a first power transfer device comprising a ferrite material, at least one electrically conductive coil, and at least one shield. The energy is wirelessly transferring either from or to a second power transfer device of the WEVC system. The method further comprises controlling induced currents in the at least one shield during operation of the WEVC system to mitigate electromagnetic radiation emissions from the WEVC system that do not contribute to wireless power transfer between the first power transfer device and the second power transfer device.

Figure 1:
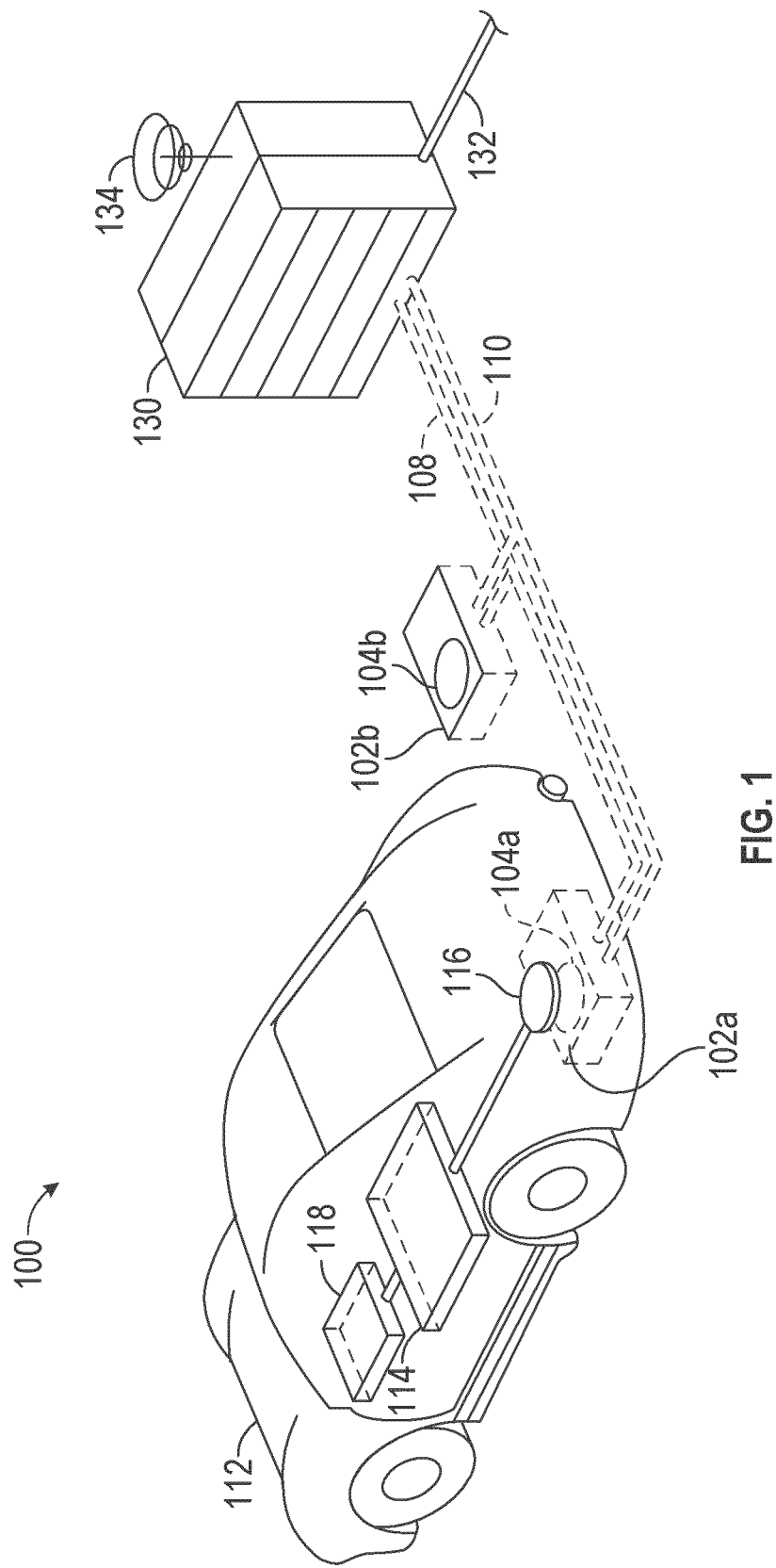
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
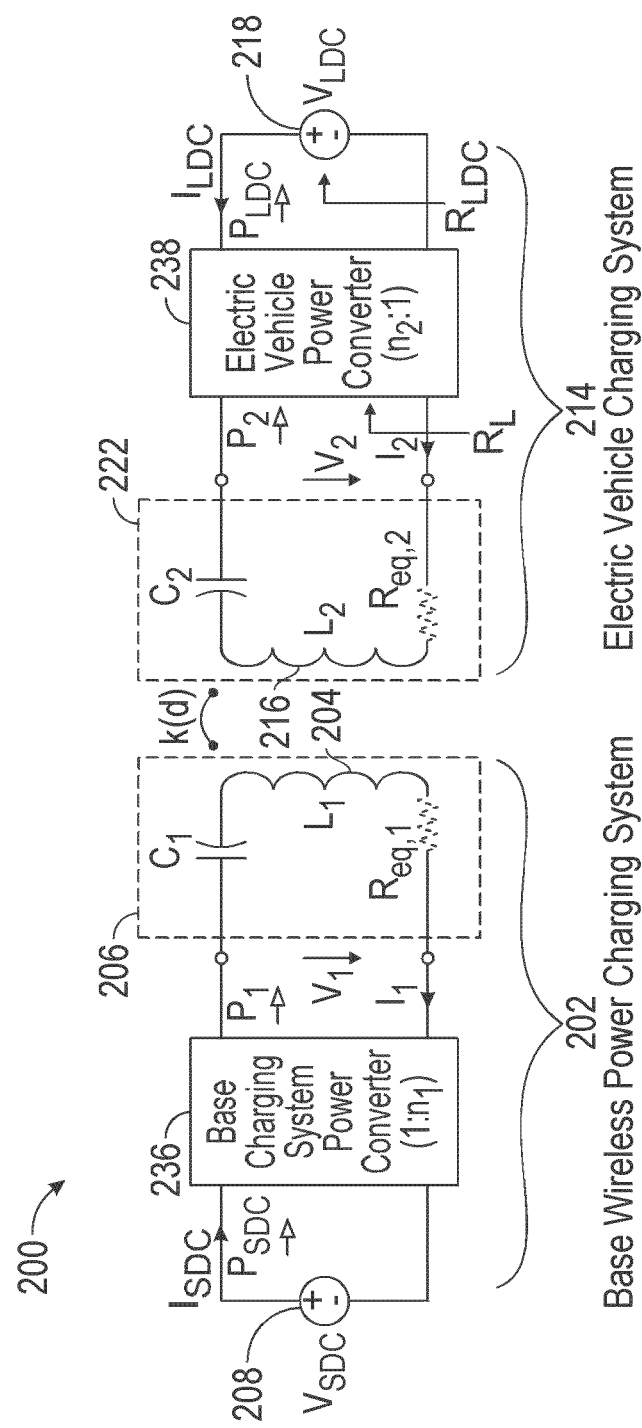
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless power charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
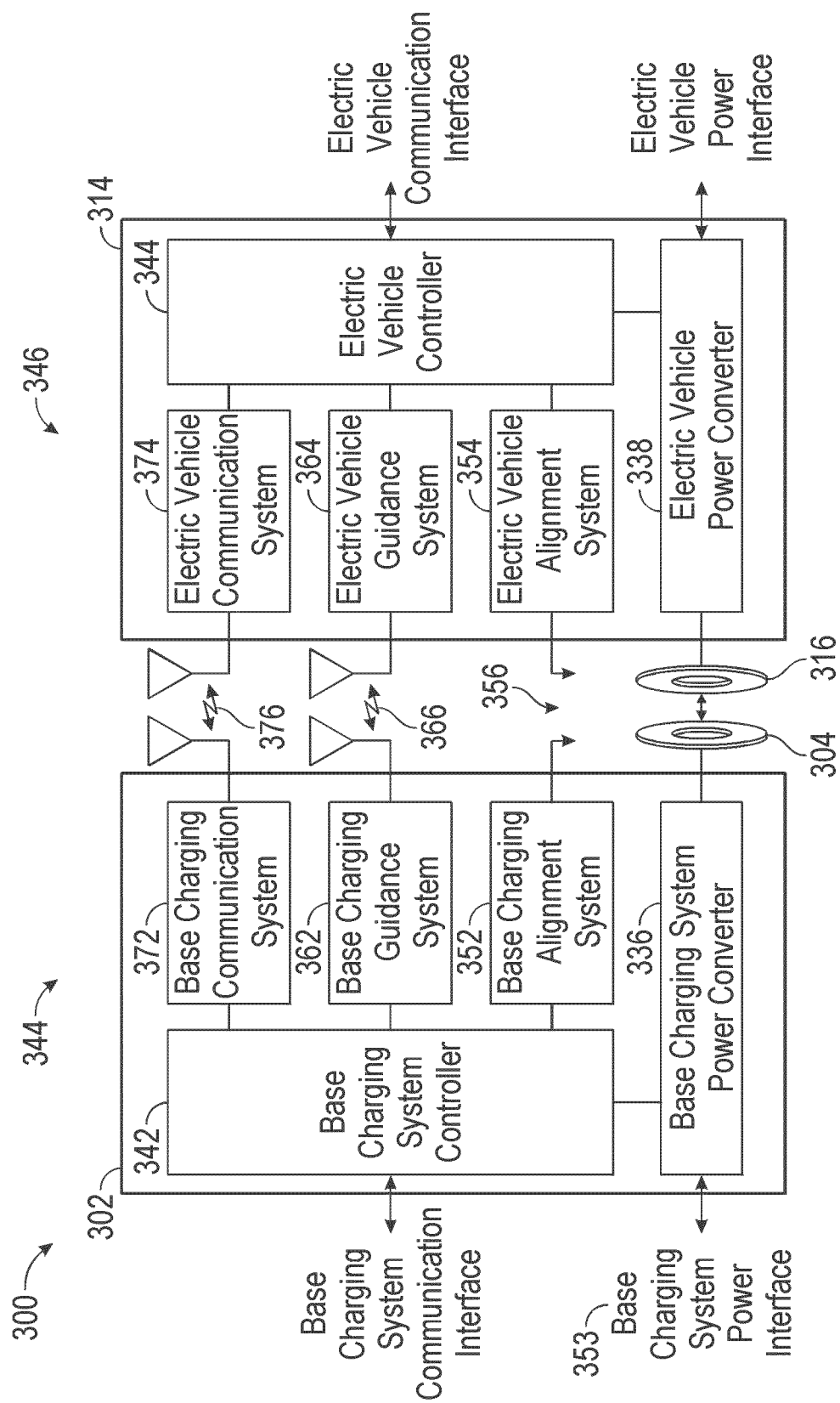
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 353 may be configured to provide power to a charging system power converter 336 from a power source, such as an AC or DC power supply 126. The base charging system power converter 336 may receive AC or DC power from the base charging system power interface 353 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless power charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
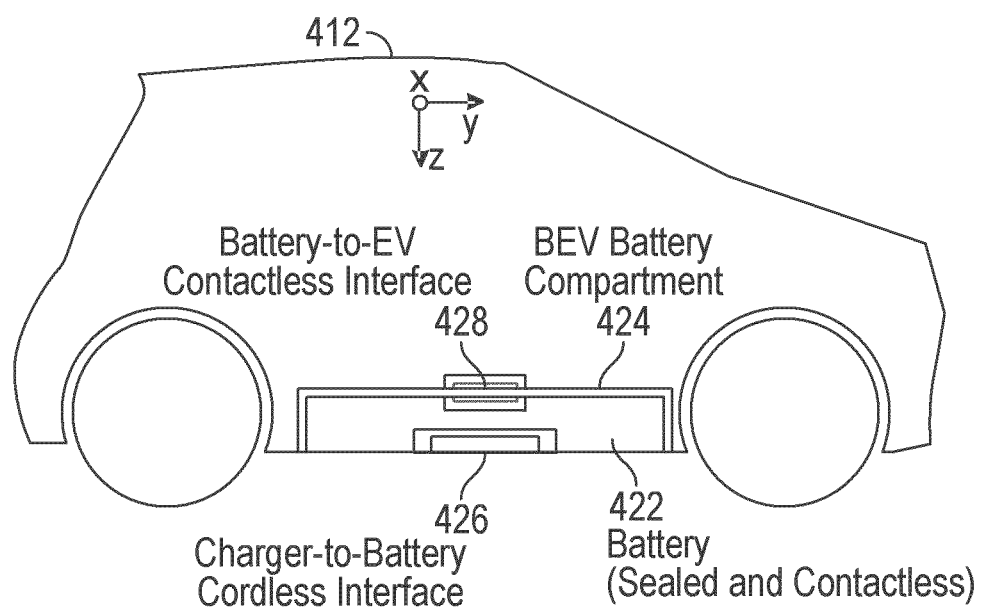
FIG. 4 is a functional block diagram showing a replaceable contactless battery disposed in an electric vehicle, in accordance with an exemplary embodiment of the invention.

The wireless power transfer system 100 described may be used with a variety of electric vehicles including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 428, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
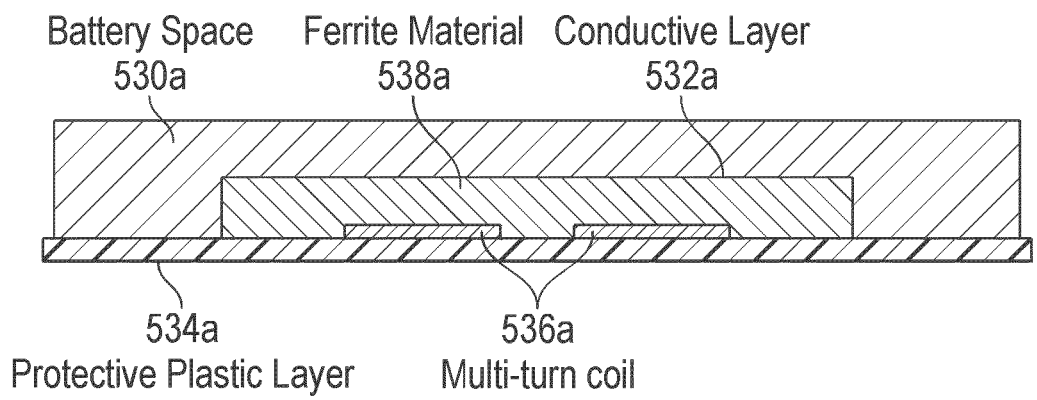
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
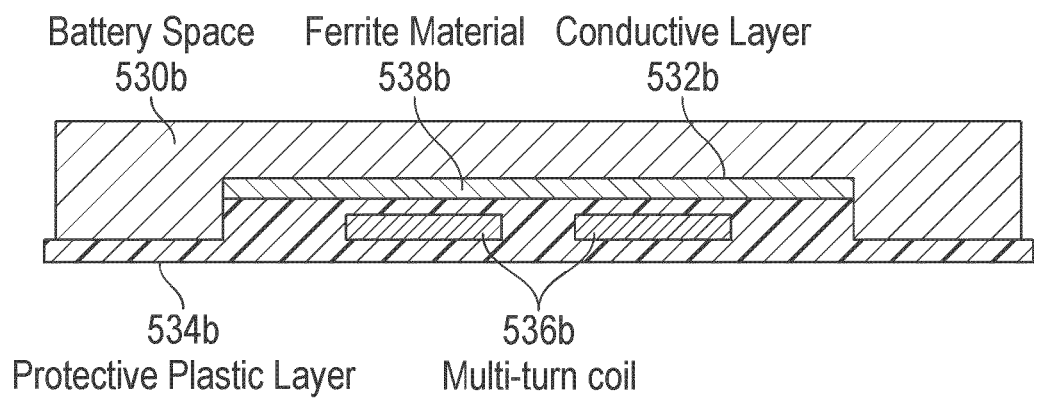

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
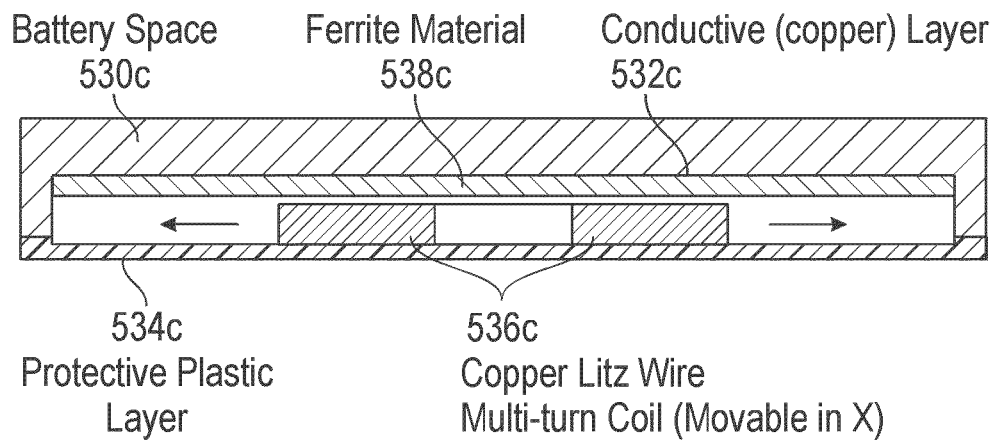
Figure 5D:
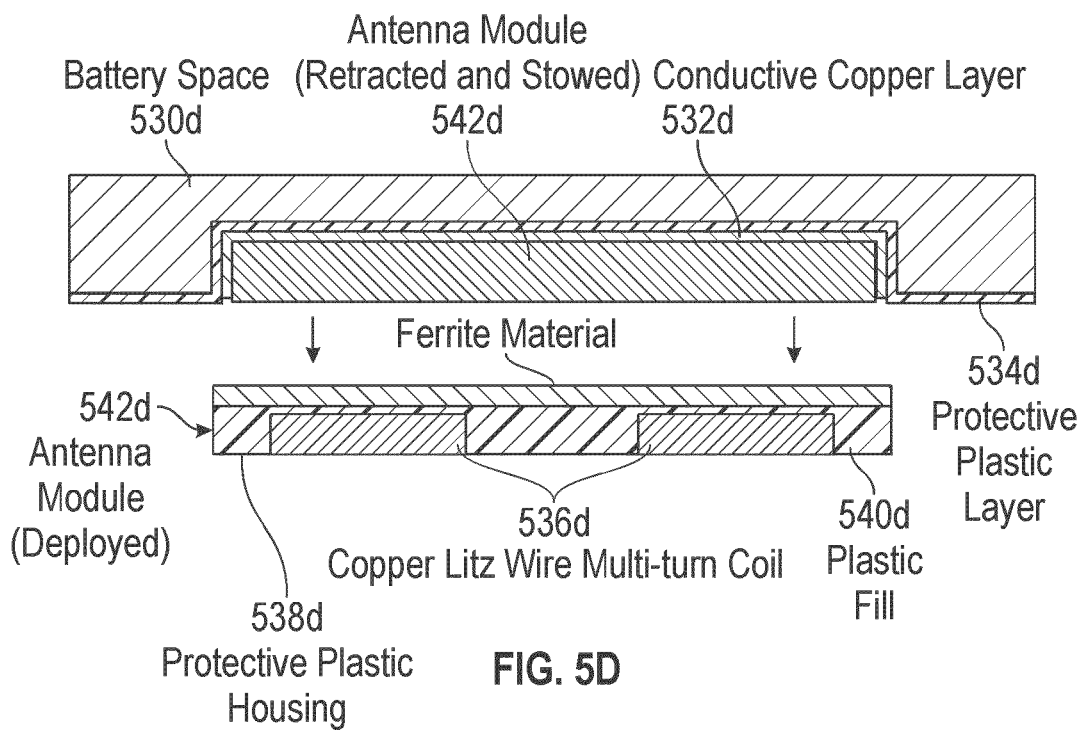

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
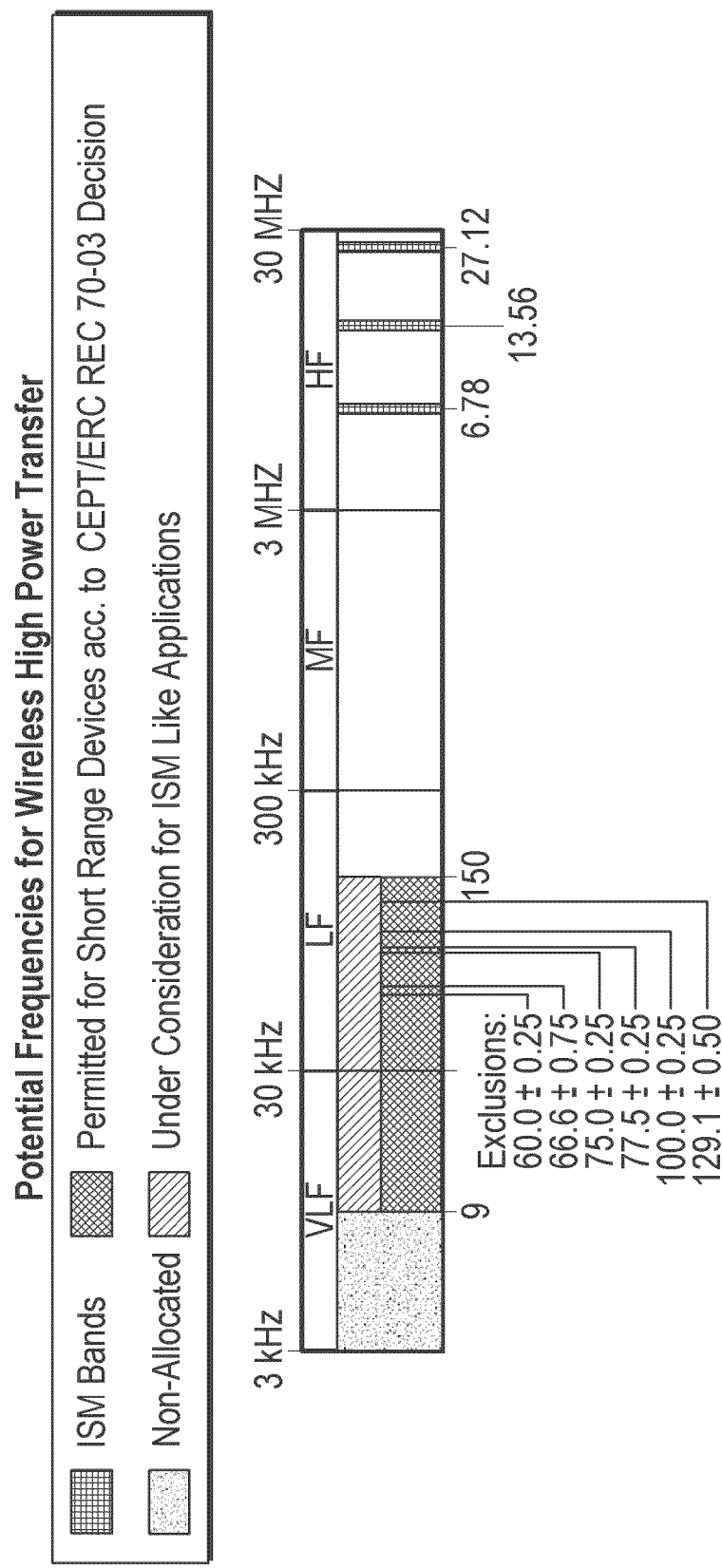
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
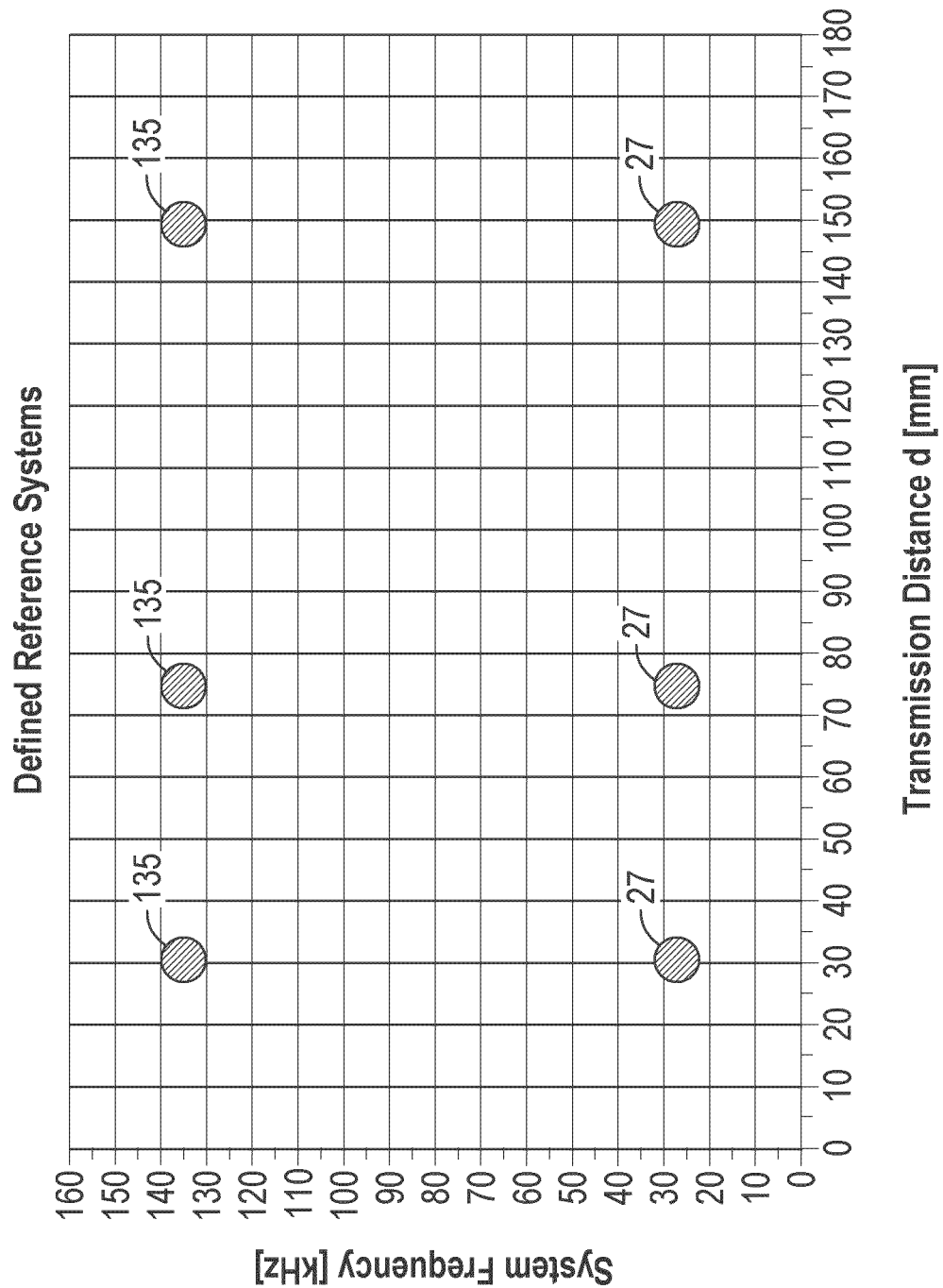
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

In certain embodiments, it is desirable to reduce emissions from the electric vehicle charging system 114 that are not directly contributing to the transfer of energy from the system to the electric vehicle. Exposure to such emissions (e.g., emitted electromagnetic radiation, such as radio-frequency or RF emissions) can induce electrical currents and electromagnetic fields in humans or equipment in close proximity to the system. If these emissions induce currents and fields with sufficiently intensity, they can have a detrimental health effect on a human exposed to the emissions, and can have a detrimental performance effect on other equipment exposed to the emissions. Therefore, it can be desirable to design a wireless electric vehicle charging (WEVC) system to mitigate (e.g., reduce, minimize, attenuate, prevent) the electromagnetic radiation emissions from such systems.

In certain embodiments, a WEVC system 114 comprises a base wireless charging system 102 (also referred to herein as a "base pad," or more generically as a "power transfer device") comprising a ferrite material, at least one base system induction coil 104, and a metallic shield in proximity to the ferrite material and the base system induction coil 104 and/or a vehicle wireless charging system (also referred to herein as a "vehicle pad," or more generically as a "power transfer device") comprising a ferrite material, at least one vehicle induction coil 116, and a metallic shield in proximity to the ferrite material and the vehicle induction coil 116 that is spaced by an air gap from the ferrite material and the at least one base system induction coil 104 of the base pad, with the metallic shield of the vehicle pad in proximity to the vehicle underbody. As used herein, the term "power transfer device" has its broadest reasonable interpretation, including but not limited to, the base wireless charging system (e.g., the base pad) or the vehicle wireless charging system (e.g., the vehicle pad), and is not restricted to any particular shape, dimensions, or combination of components. As used herein, the term "pad" has its broadest reasonable interpretation, including but not limited to, a power transfer device (e.g., a base pad, a vehicle pad) configured for use in a wireless electric vehicle charging (WEVC) system, and is not restricted to any particular shape, dimensions, or combination of components.

Conventionally, the purpose of the metallic shield (as well as the vehicle underbody) is to minimize unwanted exposure to electromagnetic radiation by the driver and passengers of the vehicle. The metallic shield can be configured to mitigate (e.g., reduce, minimize, attenuate, prevent) unwanted electromagnetic radiation from being emitted from the ferrite and coils of the base pad and/or the vehicle pad. For example, the metallic shield of the vehicle pad can be positioned between the ferrite of the vehicle pad and the metallic vehicle underbody so as to mitigate (e.g., reduce, minimize, attenuate, prevent) emissions for passengers and the driver inside the electric vehicle. Traditionally, the shields have been solid enclosures encompassing the source completely in order to achieve the desired shielding effectiveness. However, due to mechanical and thermal reasons, in conventional configurations, the shield includes cuts or perforations designed in such a way that does not disturb the initial current flow induced in the shield. In WEVC applications, it is not practical to have a shield enclosing the vehicle pad or the base pad completely as that would interfere with the power transfer operation. Traditionally, conductive shields in WEVC applications are designed as solid flat plates in order to shield the car underbody. However in such cases, the electromagnetic radiation will leak from the side of the base pad and the vehicle pad during the power transfer operation.

During operation, currents (e.g., eddy currents) can be induced on the metallic shields of the base pad and the vehicle pad, as well as on the metallic vehicle underbody. In certain embodiments, these induced currents, along with the coil currents, can influence the electric-field and magnetic-field radiated emissions so as to mitigate (e.g., reduce, minimize, attenuate, prevent) the emissions from the electric vehicle charging system 114 that do not contribute to wireless power transfer between the base pad and the vehicle pad.

Figure 8A:
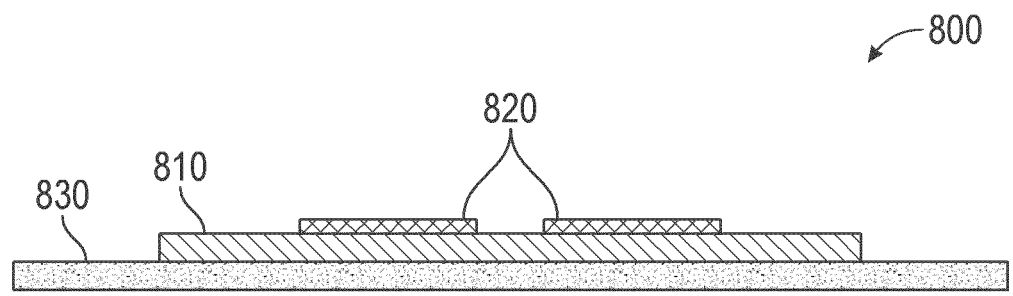
FIG. 8A schematically illustrates a side view of an example power transfer device of a wireless electric vehicle charging (WEVC) system in accordance with certain embodiments described herein.
Figure 8B:
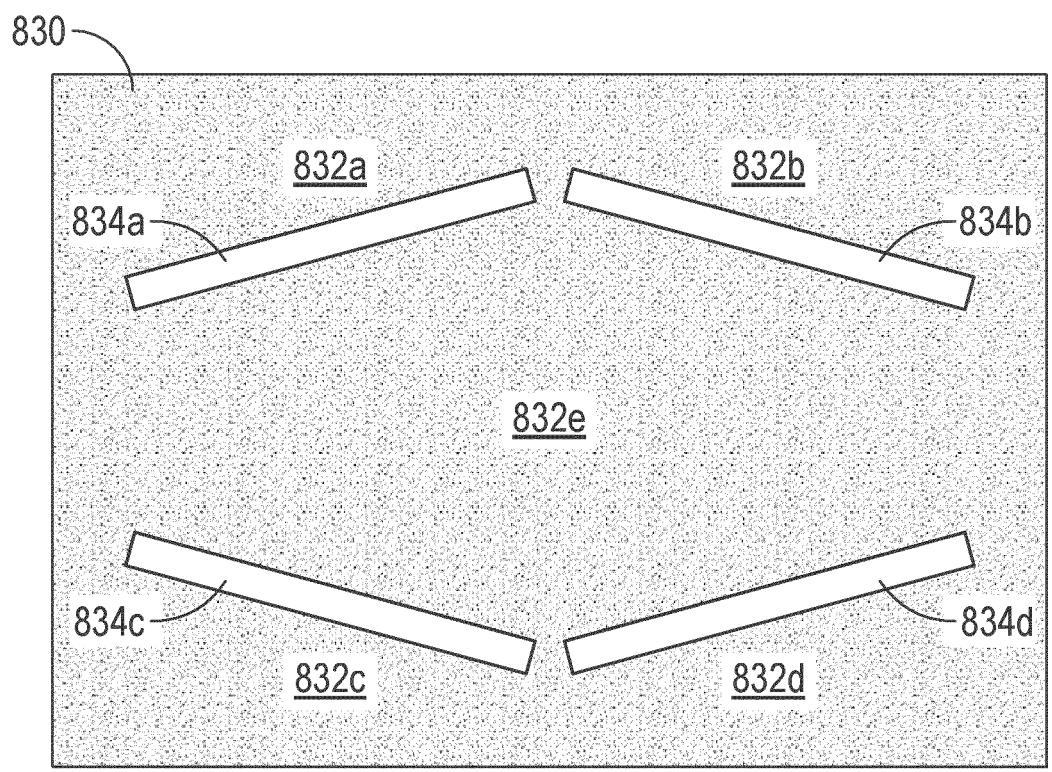
FIG. 8B schematically illustrates a top view of an example shield of the example power transfer device of FIG. 8A in accordance with certain embodiments described herein.

FIG. 8A schematically illustrates a side view of an example power transfer device 800 of a wireless electric vehicle charging (WEVC) system 114 in accordance with certain embodiments described herein. FIG. 8B schematically illustrates a top view of the example shield 830 of the power transfer device 800 of FIG. 8A in accordance with certain embodiments described herein. The power transfer device 800 comprises a ferrite material 810 and at least one electrically conductive coil 820. The ferrite material 810 and the at least one coil 820 are configured to wirelessly transfer energy either from or to a second power transfer device (not shown) of the WEVC system 114. For example, the power transfer device 800 can comprise a base pad (e.g., a ferrite material 810 and at least one coil 820 forming the base pad) configured to transmit power wirelessly to the second power transfer device and the second power transfer device can comprise the vehicle pad (e.g., mounted on the vehicle underbody). For another example, the power transfer device 800 can comprise a vehicle pad configured to receive power wirelessly from the second pad and configured to be mounted on the vehicle (e.g., can comprise the ferrite material 810 and the at least one coil 820 forming the vehicle pad) and the second power transfer device can comprise the base pad.

The power transfer device 800 further comprises at least one shield 830 comprising a plurality of electrically conducting regions 832 and one or more electrically insulating regions 834. For a power transfer device 800 comprising a vehicle pad, the at least one shield 830 can be configured to be positioned between the ferrite material 810 and the vehicle underbody. In the example schematically illustrated by FIG. 8B, the shield 830 comprises the plurality of electrically conducting regions 832a-832e and the one or more electrically insulating regions 834a-834d. The plurality of electrically conducting regions 832 and the one or more electrically insulating regions 834 are configured to control induced currents (e.g., eddy currents) in the at least one shield 830 during operation of the WEVC system 114. The induced currents mitigate electromagnetic radiation emissions from the WEVC system 114 that do not contribute to wireless power transfer between the at least one coil 820 of the power transfer device 800 and the second power transfer device. For example, when the WEVC system 114 is integrated into a vehicle, the plurality of electrically conducting regions 832 and the one or more electrically insulating regions 834 are configured to control the induced currents to mitigate electromagnetic radiation emissions emanating from under the vehicle towards the outer sides of the vehicle.

For example, the plurality of electrically conducting regions 832 can comprise a metal material, and the one or more electrically insulating regions 834 can comprise one or more gaps (e.g., cuts, holes, slots, perforations) or one or more solid electrically insulating materials between two or more of the electrically conducting regions 832. Examples of materials for the electrically conducting regions 832 include, but are not limited to, metals, alloys, and any material that has an electric conductivity sufficiently high to have the induced currents flowing the material. Examples of materials for the electrically insulating regions 834 include, but are not limited to, air, plastic, and ceramics. In the example shield 830 of FIG. 8B, the electrically insulating region 834a is between the electrically conducting region 832a and the electrically conducting region 832e. Similarly, the electrically insulating regions 834b-834d are between electrically conducting regions 832b-832d, respectively, and the electrically conducting region 832e.

The one or more electrically insulating regions can be configured to control (e.g., inhibit, redirect) flow of the induced currents between two or more of the electrically conducting regions 832. In the example shield 830 of FIG. 8B, flow of the currents induced in at least one shield 830 from the electrically conducting region 832a to the electrically conducting region 832e is at least partially constrained by the electrically insulating region 834a between the electrically conducting regions 832a, 832e. For example, the flow of the currents induced in the at least one shield 830 is constrained by the electrically insulating region 834 to flow only in one or more predetermined directions within the at least one shield 830. While one or more of the electrically insulating regions 834 of the example shield 830 of FIG. 8B are configured to allow some flow of the induced currents between the two electrically conducting regions 832 on either side of the electrically insulating region 834, in other configurations, one or more of the electrically insulating regions 834 can be configured to prevent flow of the induced currents between the two electrically conducting regions 832 on either side of the electrically insulating region 834.

In certain embodiments, the one or more electrically insulating regions 834 are configured to control flow of the induced currents such that a vector summation of electromagnetic fields arising from a combination of the induced currents and electrical currents flowing through the coils (e.g., the base pad coil and the vehicle pad coil) mitigates the electromagnetic radiation emissions from the WEVC system 114 that do not contribute to wireless power transfer (e.g., between the at least one coil 820 of the power transfer device 800 and the second power transfer device). For example, the pattern of the plurality of electrically conducting regions 832 and the one or more electrically insulating regions 834 can control the induced current flow paths such that the RF radiated emissions from the induced currents have an opposite phase from the RF radiated emissions from the other portions of the WEVC system 114 (e.g., the coils 304, 316)

at distances away from the electric vehicle, thereby canceling at least a portion of the RF radiated emissions and lowering the RF radiated emissions at distances away from the electric vehicle.

In accordance with the above, in an aspect, patterns in the one or more electrically insulating regions 834 can be configured to control flow of the induced current to alter emissions from at least one shield 830 such that there is a cancellation effect with other emissions from the power transfer device (e.g., the base pad and the vehicle pad) to reduce total RF radiated emissions. For example, the one or more electrically insulating regions 834 can be configured to control flow of the induced currents wherein at least one of the induced currents flows in a selected direction to produce emissions that result in a reduction (e.g., a predetermined amount of reduction) of the total RF radiated emissions from the power transfer device 800 that do not contribute to operational wireless power transfer of the power transfer device 800. For another example, the one or more electrically insulating regions 834 can be configured to control flow of the induced currents such that a first amount of induced currents flowing in a first electrically conducting region 832 of the at least one shield 830 is increased as compared to a second amount of induced currents flowing in a second electrically conducting region 832 of the at least one shield 830. The pattern of the plurality of electrically conducting regions 832 and the one or more electrically insulating regions 834 is designed in such a way that the induced currents in the at least one shield 830 counteract the radiated fields generated by the base pad current and the vehicle pad current together.

Certain such embodiments are different from conventional designs which utilize solid metallic plates or solid metallic enclosures as the shield of the power transfer device (e.g., the base pad or the vehicle pad). For mechanical and thermal considerations, such conventional designs included only either minimal gaps (e.g., cuts, slots, perforations) or gaps which do not appreciably affect the induced current flow to prevent, in one aspect, the solid metallic plates from becoming a secondary source of radiation of RF emissions due to unavoidable induced currents. In contrast, in accordance with aspects of certain embodiments, portions of the shield 830 can be altered in a manner to utilize the induced currents by intelligently controlling the flow of the induced currents in the shield 830. In some form, using the induced currents in this manner can cause the shield 830 to act as a secondary source of radiation, but in a way that selectively reduces the amount of emissions in certain areas around the system as described herein. In contrast to certain conventional structures, certain embodiments described herein are designed to tailor the induced currents to serve the purpose of mitigating electromagnetic radiation emissions from the WEVC system 114 that do not contribute to wireless power transfer between the at least one coil 820 of the power transfer device 800 and the second power transfer device.

Figure 9:
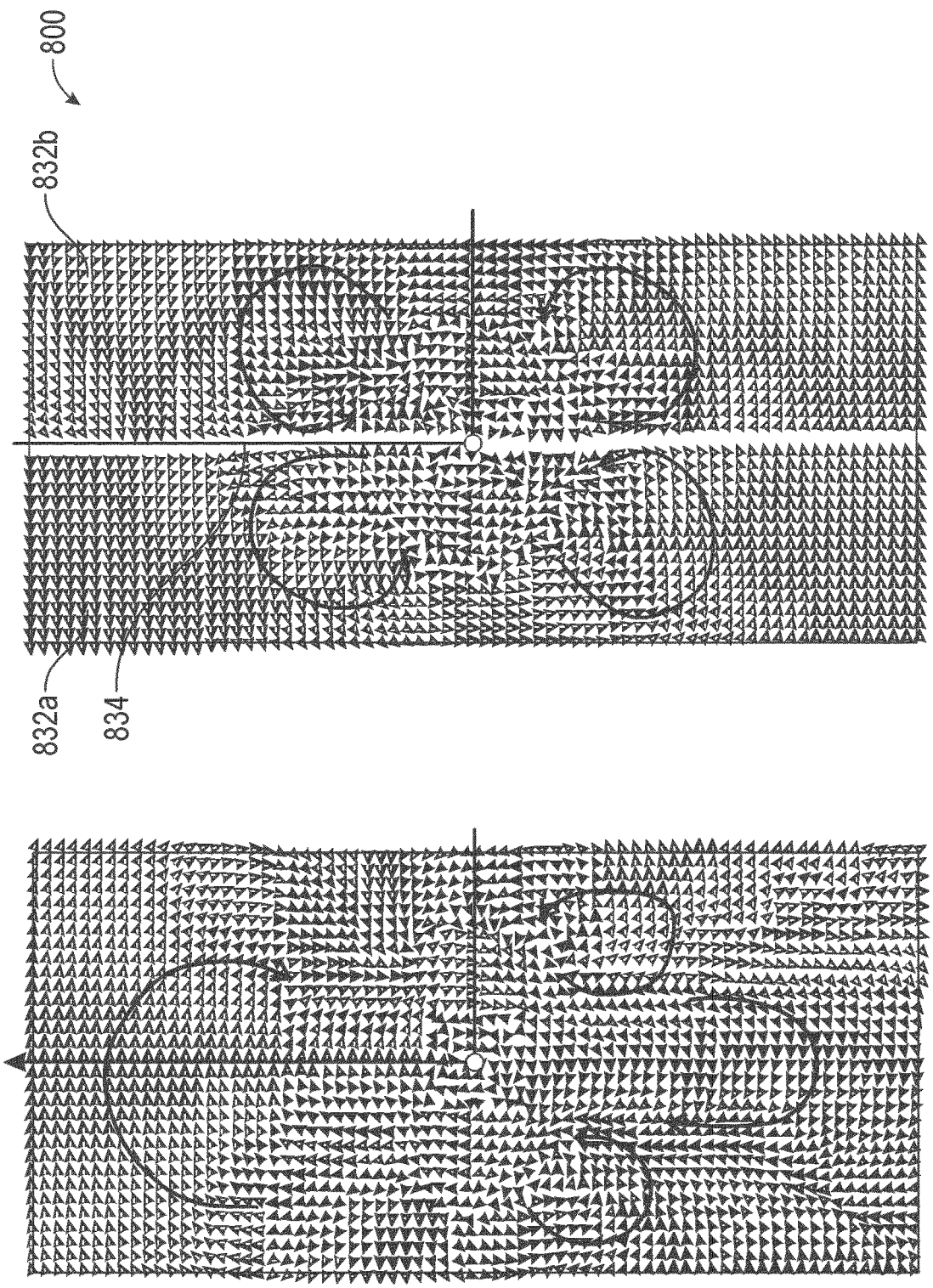
FIG. 9 schematically illustrates the effect of a vertical cut in a shield in accordance with certain embodiments described herein.

FIG. 9 schematically illustrates the effect of a vertical cut in a shield 830 in accordance with certain embodiments described herein. On the left side of FIG. 9, the induced currents in an example conventional solid vehicle pad shield are shown. The conventional solid vehicle pad shield is electrically conductive and does not comprise any electrically insulating regions. Thus, currents induced in the conventional solid vehicle pad shield (e.g., eddy currents) can flow in any direction within the shield. On the right side of FIG. 9, the induced currents in an example shield 830 with a vertical electrically insulating region 834 (e.g., a vertical cut) extending through the center of the shield 830 are shown, with the electrically insulating region 834 dividing the shield 830 into two electrically conducting regions 832a, 832b spaced from one another. Due to the electrically insulating region 834, the induced currents are controlled so as to not flow between the electrically conducting region 832a and the electrically conducting region 832b. FIG. 9 schematically illustrates that the induced currents can be controlled in a manner to mitigate electromagnetic radiation emissions from the power transfer device.

Figure 10A:
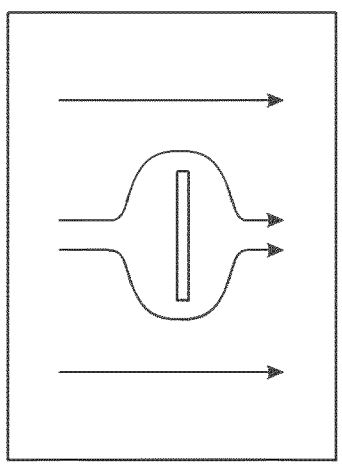
FIG. 10A-10E schematically illustrate the effect of example apertures (e.g., slots, holes) on induced currents in conventional shield designs.
Figure 10B:
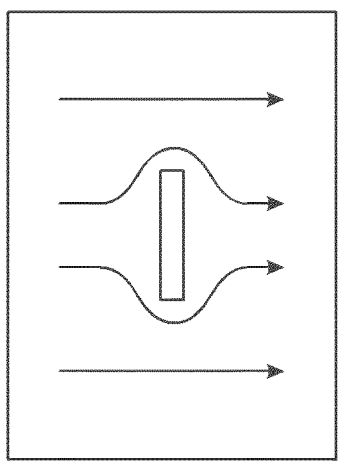
Figure 10C:
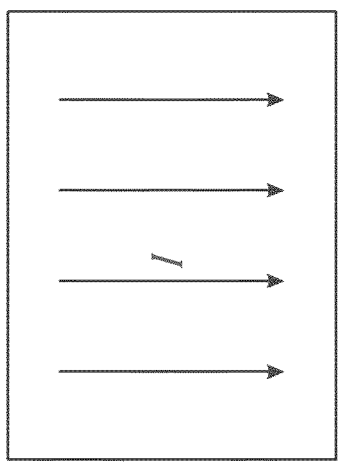
Figure 10D:
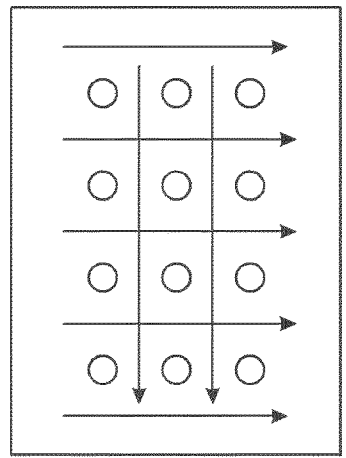
Figure 10E:
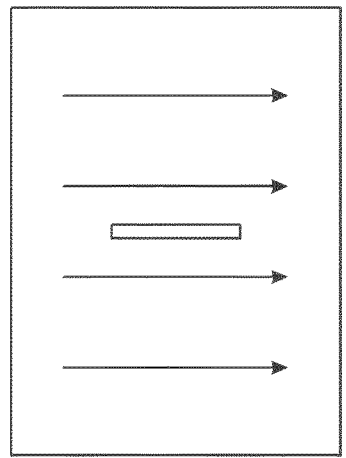

Some conventional shield designs have included apertures in the shield for other purposes besides controlling the induced currents. FIGS. 10A-10E schematically illustrate the effect of example apertures (e.g., slots, holes) on induced currents (e.g., eddy currents) in conventional shield designs (see, Clayton Paul, "Introduction to Electromagnetic Compatibility," FIG. 10.16, $2^{nd}$ Edition, John Wiley & Sons Inc., Hoboken, N.J., USA, 2006). For example, FIG. 10A schematically illustrates the induced currents induced in a shield with no apertures, and FIG. 10D schematically illustrates that a single, relatively small slit extending in a direction generally parallel to the induced current flow has even a smaller effect, if any, on the induced current flow. FIG. 10E schematically illustrates an array of small slots or holes punched in the shield for mechanical or thermal constraints can provide ventilation (the many small holes can provide as much ventilation as one long slot), but they only perturb the induced current by a small amount, regardless of the direction of the induced currents. FIGS. 10A, 10D and 10E are suggested ways in the literature to introduce slots or holes in the shield for mechanical and thermal constraints without perturbing the induced current flow significantly. On the other hand, FIGS. 10B and 10C schematically illustrate that a slit extending in a direction generally perpendicular to the induced current flow will modify and perturb the flow. These examples are shown in literature to avoid such cuts that perturb the induced current flow. However, controlling the flow of induced currents can be achieved by using a plurality of electrically conducting regions 832 and one or more electrically insulating regions 834 configured to control induced currents to mitigate electromagnetic radiation emissions from the WEVC system that do not contribute to wireless power transfer between the at least one coil 820 of the power transfer device 800 and a second power transfer device. In contrast, certain embodiments described herein include electrically insulating regions 834 (e.g., slots cut along extended lengths or the entire length of the shield 830) configured to significantly alter the current flow paths of the induced currents so as to mitigate the electromagnetic radiation emissions from the WEVC system (e.g., from the power transfer device 800).

Figure 11C:
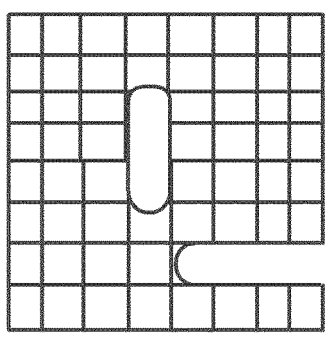
FIGS. 11A-11F schematically illustrate example locations and natures of the electrically insulating regions (e.g., slots) configured to control the induced current flow path in accordance with certain embodiments described herein.
Figure 11B:
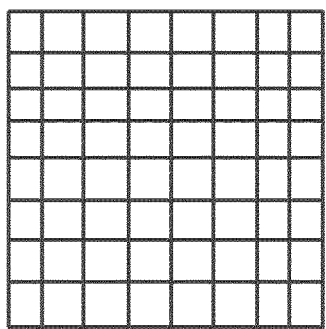
Figure 11A:
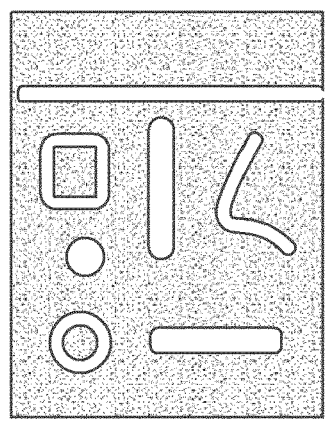
Figure 11F:
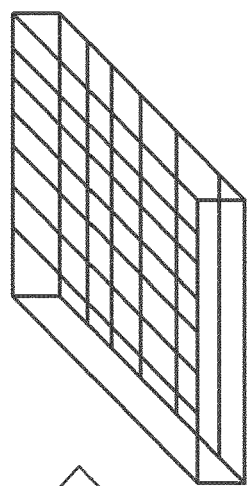
Figure 11E:
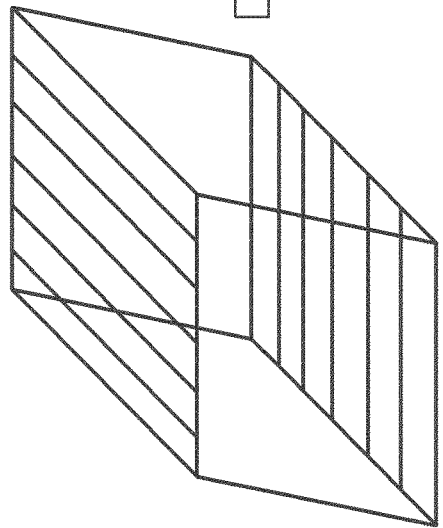
Figure 11D:

FIGS. 11A-11F schematically illustrate example locations and natures of the electrically insulating regions 834 (e.g., slots, holes, cuts, perforations, solid insulating material) configured to control the induced current flow path in accordance with certain embodiments described herein. The locations and natures of the electrically insulating regions 834 can be dependent on the current path distribution on the metallic shield 830, and can be design-specific for a given WEVC system 114 and vehicle structure. For example, as shown in FIG. 11A, shapes of the one or more electrically insulating regions 834 can include, but are not limited to, circular, elongate, annular, rectangular, linear, and curved. Additionally, the shield structure is not necessarily limited to a rectangular shape and could be designed in various shapes, but not limited to, circular, elliptical, rectangular shape with rounded edges, and any arbitrary shape that could also contain one or more ledges or protrusions that are not limited to the same plane as other portions of the shield. As shown in FIGS. 11B-11F, the shield design can include variations such as mesh style (FIG. 11B), mesh style with additional perforations/cuts/slots of various sizes and shapes (FIG. 11C), grill style in one direction (FIG. 11D) or grill style in two directions (expanded view shown in FIG. 11E, compressed view shown in FIG. 11F).

Figure 12:
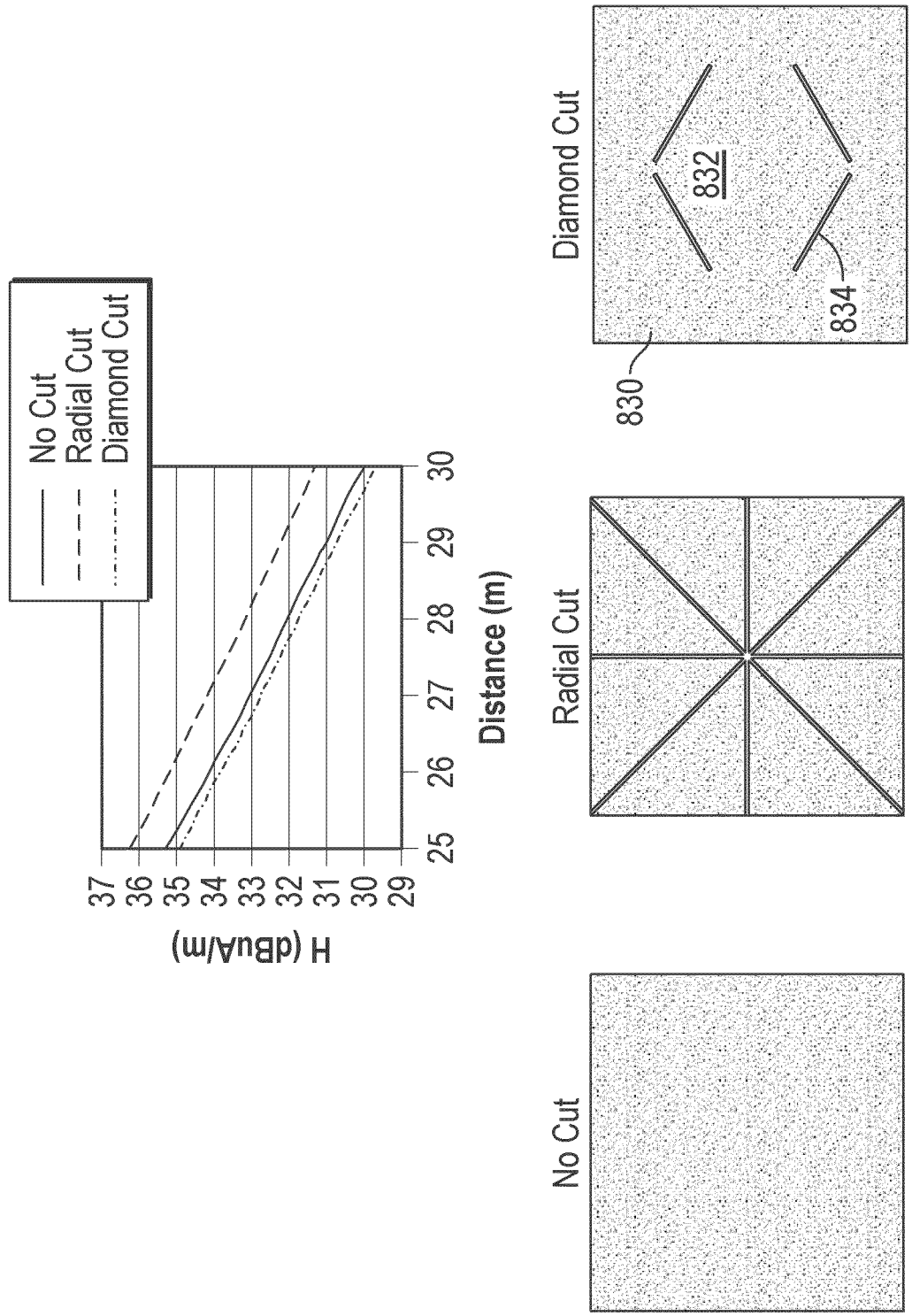
FIG. 12 shows three example shield designs and a plot of the modeled electromagnetic radiation emissions from a WEVC system that includes such shield designs.

FIG. 12 shows three example shield designs and a plot of the modeled electromagnetic radiation emissions from a WEVC system 114 that includes such shield designs. In a first shield design at the bottom left of FIG. 12 (labeled "No cut"), the shield is a conventional unitary solid metal plate with no cuts that may otherwise control (e.g., influence) induced currents (e.g., eddy currents) in the shield. In a second shield design at the bottom center of FIG. 12 (labeled "Radial cut"), the shield is a conventional plurality of segmented metal plate portions that are separated from one another by cuts that extend radially from the center towards the center of the four sides of the shield and towards the four corners of the shield. In a third shield design in accordance with certain embodiments described herein at the bottom right of FIG. 12 (labeled "Diamond cut"), the shield 830 comprises a plurality of electrically conducting regions 832 and one or more electrically insulating regions 834. The plot at the top center of FIG. 12 illustrates the modeled electromagnetic radiation emissions from a WEVC system 114 that do not contribute to wireless power transfer between the power transfer devices of the WEVC system 114. The plot of FIG. 12 is shown as a function of distance from the shield for either the first shield design, the second shield design, or the third shield design.

As shown in FIG. 12, the conventional "radial cut" shield design increases the electromagnetic radiation emissions from the WEVC system that includes such a shield design, as compared to the conventional "no cut" shield design. In contrast, the example "diamond cut" shield design in accordance with certain embodiments described herein decreases the electromagnetic radiation emissions from the WEVC system that includes such a shield design, as compared to the conventional "no cut" shield design.

The orientation of the power transfer device 800 and the second power transfer device relative to one another can be adjusted to facilitate the mitigation of the electromagnetic radiation emissions from the WEVC system 114. By adjusting these orientations, the induced currents and the resultant electromagnetic radiation emissions can be varied to find an orientation that optimizes the mitigation relative to other orientations.

Figure 13:
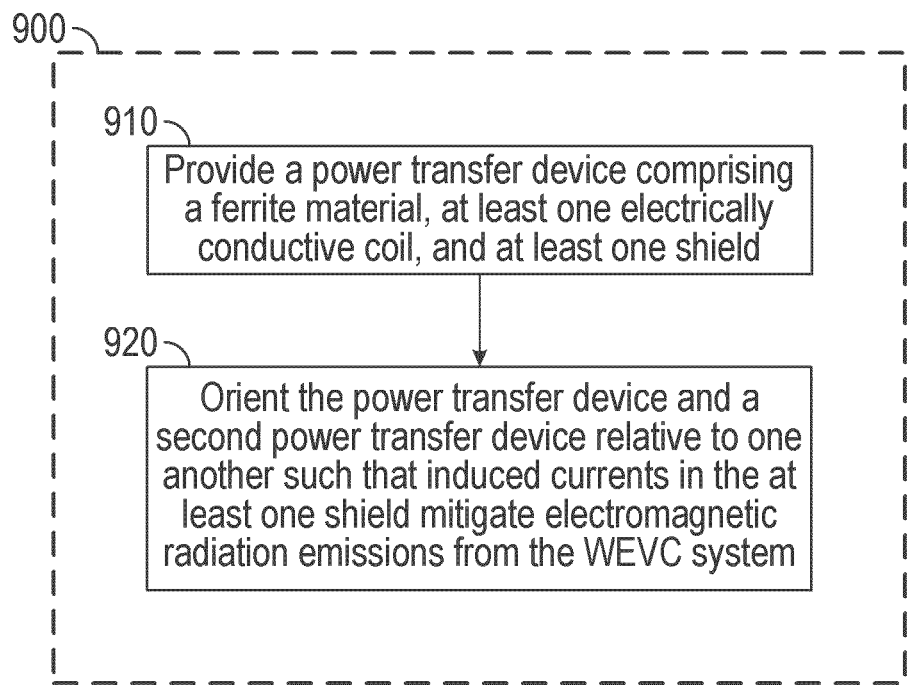
FIG. 13 is a flow diagram of an example method for mitigating electromagnetic radiation emissions from a WEVC system in accordance with certain embodiments described herein.

FIG. 13 is a flow diagram of an example method 900 for mitigating electromagnetic radiation emissions from a wireless electric vehicle charging (WEVC) system 114 in accordance with certain embodiments described herein. While the method 900 is described by referring to the structural features shown in FIGS. 8A and 8B, the method 900 may be performed using other structural features. In an operational block 910, the method 900 comprises providing a power transfer device 800 comprising a ferrite material 810 and at least one electrically conductive coil 820. The ferrite material 810 and the at least one coil 820 are configured to wirelessly transfer energy either from or to a second power transfer device of the WEVC system 114. The power transfer device 800 further comprises at least one shield 830 comprising a plurality of electrically conducting regions 832 and one or more electrically insulating regions 834. The plurality of electrically conducting regions 832 and the one or more electrically insulating regions 834 are configured to control induced currents in the at least one shield 830 during operation of the WEVC system 114. In an operational block 920, the method 900 further comprises orienting the power transfer device 800 and the second pad relative to one another such that the induced currents mitigate electromagnetic radiation emissions from the WEVC system 114 that do not contribute to wireless power transfer between the at least one coil 820 and the power transfer device 800 and the second power transfer device.

In certain embodiments, orienting the power transfer device 800 and the second power transfer device relative to one another comprises mounting the power transfer device 800 to a vehicle such that, upon positioning the vehicle for wireless power transfer using the WEVC system 114, a vector summation of electromagnetic fields arising from a combination of the induced currents and electrical currents flowing through the at least one coil 820 mitigates the electromagnetic radiation emissions from the WEVC system 114 that do not contribute to wireless power transfer between the at least one coil 820 and the power transfer device 800 and the second power transfer device. The one or more electrically insulating regions 834 can constrain the flow of the induced currents to be only in one or more predetermined directions. The one or more electrically insulating regions 834 can increase a first amount of induced currents flowing in a first electrically conducting region 832 of the at least one shield 830 as compared to a second amount of induced currents flowing in a second electrically conducting region 832 of the at least one shield 830. The one or more electrically insulating regions 834 can allow some flow of the induced currents between the two electrically conducting regions 832 on either side of the electrically insulating region 834, or the one or more electrically insulating regions 834 can prevent flow of the induced currents between the two electrically conducting regions 832 on either side of the electrically insulating region 834.

Figure 14:
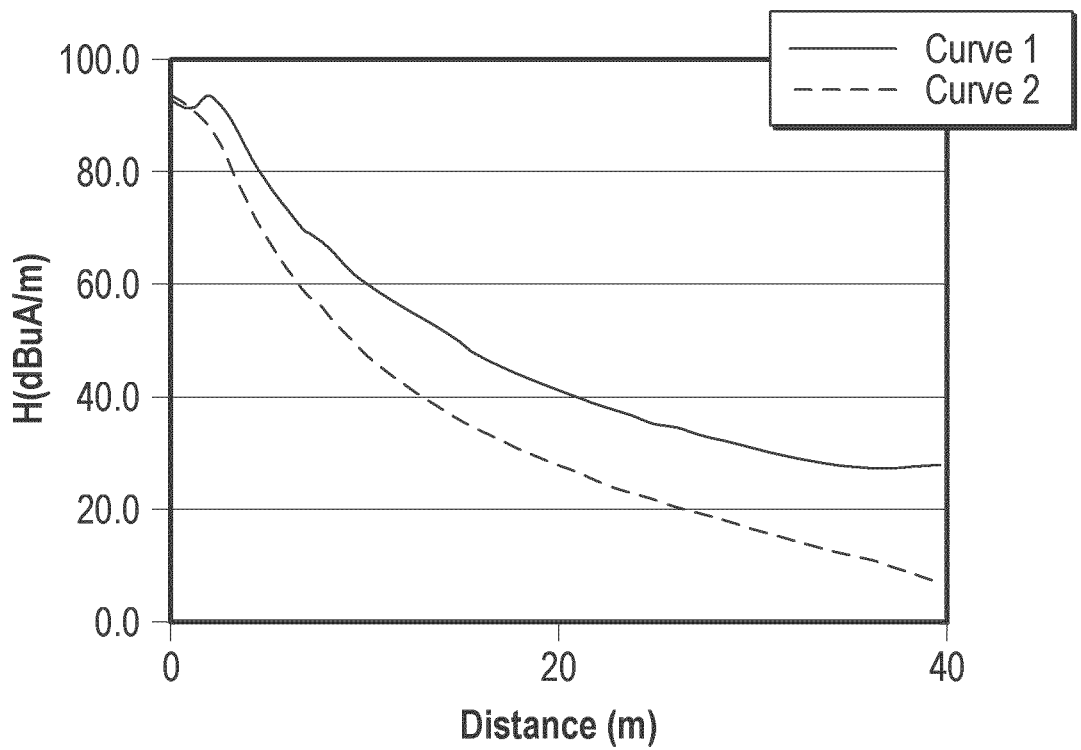
FIG. 14 is a plot of the modeled electromagnetic radiation emissions from a WEVC system with a power transfer device, including its shield, at two different orientations relative to a second power transfer device.

FIG. 14 is a plot of the modeled electromagnetic radiation emissions from a WEVC system 114 with a power transfer device 800 (e.g., a vehicle pad), including its shield 830, at two different orientations relative to a second power transfer device (e.g., a base pad). The shield 830 of the power transfer device 800 is shown on the left-hand-side of FIG. 9. A first curve (labeled "Curve 1") corresponds to the modeled electromagnetic radiation emissions in which the power transfer device 800 and the shield 830 have a first orientation relative to the second power transfer device, and a second curve (labeled "Curve 2) corresponds to the modeled electromagnetic radiation emissions in which the power transfer device 800 and the shield 830 have a second orientation relative to the second power transfer device. The second orientation is rotated by 90 degrees about a center axis extending perpendicularly from the power transfer device 800 towards the second power transfer device (e.g., in a direction perpendicular to the page of FIG. 9) relative to the first orientation. As can be seen in FIG. 14, the second orientation mitigates the electromagnetic radiation emissions from the WEVC system 114 as compared to the first orientation.

Figure 15:
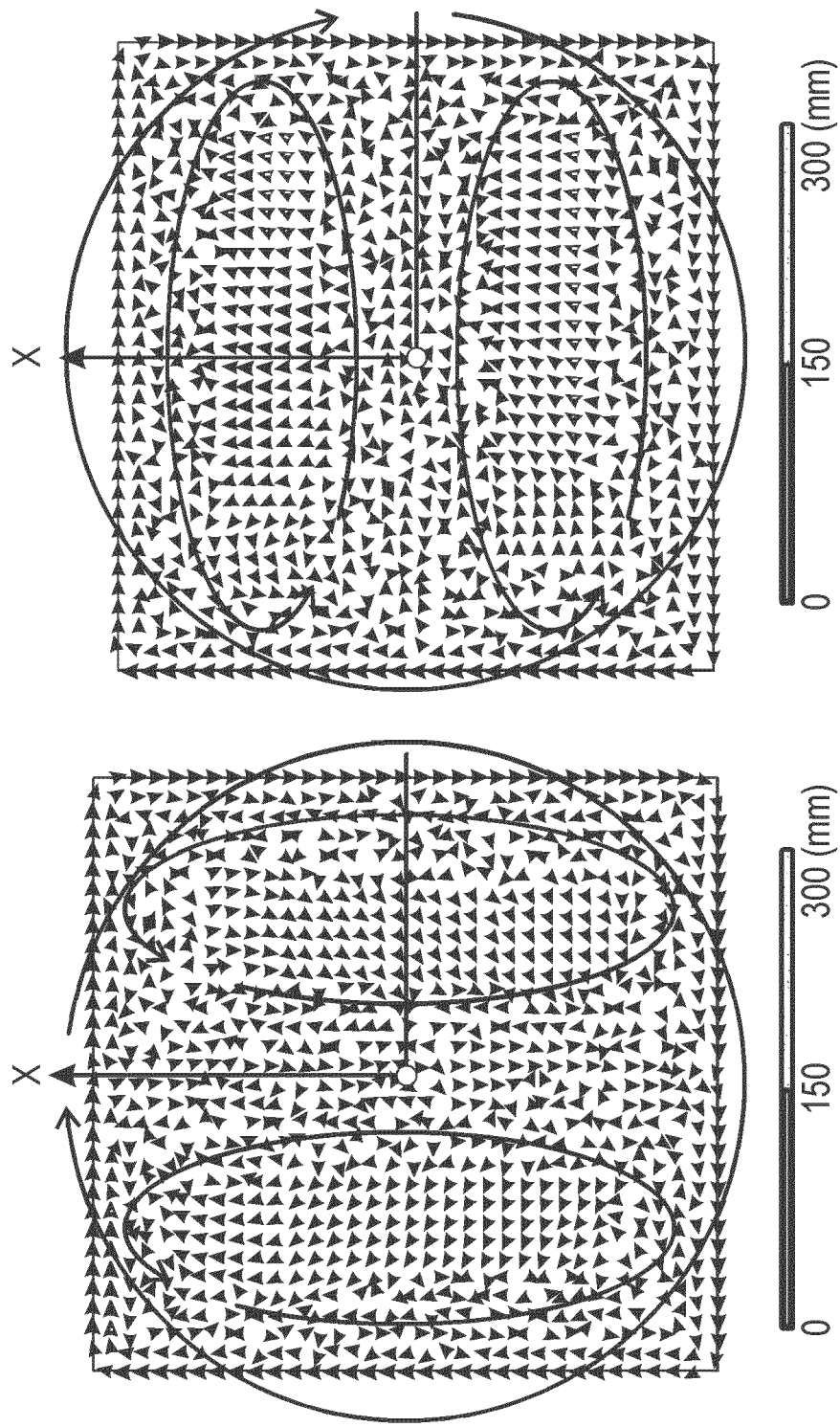
FIG. 15 is a plot of the changed induced current flow induced on a conventional shield by rotating the coils of power transfer device (e.g., the vehicle pad) 90 degrees about a direction substantially perpendicular to the shield.

FIG. 15 is a plot of the changed induced current flow induced on a conventional shield by rotating the coils of power transfer device (e.g., the vehicle pad) 90 degrees about a direction substantially perpendicular to the shield. The shield of FIG. 15 is a conventional shield which does not include any electrically insulating regions. As can be seen in FIG. 15, by rotating the coils 90 degrees, the induced currents have also been rotated 90 degrees. This plot shows that it is possible to design or control the current flow directions in such a way that the emissions from multiple current sources, including the base pad coil current, vehicle pad coil current, and the induced currents, cancel each other to a degree such that the total emission level is reduced (e.g., minimized). In certain embodiments, this reduction of the total emission level is achieved by designing a pattern of electrically conducting regions and electrically insulating regions of the at least one shield. In certain other embodiments, this reduction of the total emission level is achieved by rotating the vehicle coil to change the relative phase among the base pad coil current, the vehicle pad coil current, and the induced currents to yield the desired cancellation.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, in certain embodiments, a power transfer device of a wireless electric vehicle charging (WEVC) system comprises means for wirelessly transferring energy either from or to a second power transfer device of the WEVC system and means for mitigating electromagnetic radiation emissions from the WEVC system that do not contribute to said wirelessly transferring energy. The mitigating means can comprise a plurality of electrically conducting regions and one or more electrically insulating regions. The wirelessly transferring energy means can comprise, for example, a ferrite material and at least one electrically conductive coil. The mitigating means can comprise, for example, at least one shield comprising the plurality of electrically conducting regions and the one or more electrically insulating regions. The plurality of electrically conducting regions and the one or more electrically insulating regions can be configured to control induced currents in the at least one shield during operation of the WEVC system, with the induced currents mitigating the electromagnetic radiation emissions from the WEVC system that do not contribute to said wirelessly transferring energy.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A power transfer device of a wireless electric vehicle charging (WEVC) system, the power transfer device comprising:
   a ferrite material and at least one electrically conductive coil, the ferrite material and the at least one electrically conductive coil configured to wirelessly transfer energy from an electromagnetic field comprising first electromagnetic radiation emissions; and
   at least one shield structure positioned on a side of the ferrite material opposite the at least one electrically conductive coil and comprising a plurality of electrically conducting regions and one or more electrically insulating regions, wherein the electromagnetic field induces currents in the at least one shield structure, the currents generating second electromagnetic radiation emissions, wherein the one or more electrically insulating regions are located between two or more of the plurality of electrically conducting regions, and wherein the plurality of electrically conducting regions and the one or more electrically insulating regions are arranged in a pattern that generates the second electromagnetic radiation emissions with an opposite phase from the first electromagnetic radiation emissions and substantially cancels at least a portion of the first electromagnetic radiation emissions that do not contribute to the energy transfer via the first electromagnetic field and the at least one electrically conductive coil.

2. The power transfer device of claim 1, wherein the plurality of electrically conducting regions comprises a metal material.

3. The power transfer device of claim 1, wherein the one or more electrically insulating regions comprises one or more gaps between two or more of the electrically conducting regions.

4. The power transfer device of claim 1, wherein the one or more electrically insulating regions comprises a solid electrical insulating material.

5. The power transfer device of claim 1, wherein the power transfer device is configured to be mounted on a vehicle and configured to receive power wirelessly from a second power transfer device, the second power transfer device comprising a base pad.

6. The power transfer device of claim 1, wherein the power transfer device comprises a base pad configured to transmit power wirelessly to a second power transfer device, the second power transfer device mounted on a vehicle.

7. The power transfer device of claim 1, wherein the one or more electrically insulating regions are configured to control flow of the currents such that a vector summation of electromagnetic fields arising from a combination of the currents and electrical currents flowing through the at least one coil mitigates the electromagnetic radiation emissions that do not contribute to the energy transfer.

8. The power transfer device of claim 1, wherein the one or more electrically insulating regions are configured to control flow of the currents by constraining the flow of the currents to be only in one or more predetermined directions.

9. The power transfer device of claim 1, wherein the one or more electrically insulating regions are configured to control flow of the currents such that a first amount of currents flowing in a first electrically conducting region of the at least one shield structure is increased as compared to a second amount of currents flowing in a second electrically conducting region of the at least one shield structure.

10. The power transfer device of claim 1, wherein the one or more electrically insulating regions are configured to allow some flow of the currents between the two electrically conducting regions on either side of the electrically insulating region.

11. The power transfer device of claim 1, wherein the one or more electrically insulating regions are configured to prevent flow of the currents between the two electrically conducting regions on either side of the electrically insulating region.

12. A power transfer device of a wireless electric vehicle charging (WEVC) system, the power transfer device comprising:

means for wirelessly transferring energy from an electromagnetic field comprising first electromagnetic radiation emissions;

means for enhancing coupling with the electromagnetic field; and means for mitigating electromagnetic radiation emissions that do not contribute to said wirelessly transferring energy, the mitigating means comprising a plurality of electrically conducting regions and one or more electrically insulating regions and positioned on a side of the coupling enhancing means opposite the wirelessly transferring energy means, wherein the electromagnetic field induces currents in the means for mitigating electromagnetic radiation emissions that do not contribute to said wirelessly transferring energy radiation, the currents generating second electromagnetic radiation emissions, wherein the one or more electrically insulating regions are located between two or more of the electrically conducting regions, and wherein the plurality of electrically conducting regions and one or more electrically insulating regions are arranged in a pattern that generates the second electromagnetic radiation emissions with an opposite phase from the first electromagnetic radiation emissions and substantially cancels at least a portion of the first electromagnetic radiation emissions that do not contribute to the energy transfer via the first electromagnetic field and the at least one electrically conductive coil.

13. The power transfer device of claim 12, wherein the wirelessly transferring energy means comprises at least one electrically conductive coil and wherein the coupling enhancing means comprises a ferrite material.

14. The power transfer device of claim 13, wherein the mitigating means comprises at least one shield structure comprising the plurality of electrically conducting regions and the one or more electrically insulating regions, the currents mitigating the electromagnetic radiation emissions that do not contribute to said wirelessly transferring energy.

15. A method of mitigating electromagnetic radiation emissions from a wireless electric vehicle charging (WEVC) system, the method comprising:

providing wireless power to a power transfer device comprising a ferrite material and at least one electrically conductive coil, the ferrite material and the at least one coil configured to wirelessly transfer energy from an electromagnetic field, the electromagnetic field comprising first electromagnetic radiation emissions, the power transfer device further comprising at least one shield structure positioned on a side of the ferrite material opposite the at least one electrically conductive coil, wherein the at least one shield structure comprises a plurality of electrically conducting regions and one or more electrically insulating regions, wherein the electromagnetic field induces currents in the at least one shield structure, the currents generating second electromagnetic radiation emissions, wherein the one or more electrically insulating regions are located between two or more of the electrically conducting regions, and wherein the plurality of electrically conducting regions and or more electrically insulating regions are arranged in a pattern that generates the second electromagnetic radiation emissions with an opposite phase from the first electromagnetic radiation emissions and substantially cancels at least a portion of the first electromagnetic radiation emissions that do not contribute to wireless energy transfer via the electromagnetic field and the at least one electrically conductive coil.

16. The method of claim 15, wherein orienting the power transfer device comprises mounting the power transfer device to a vehicle such that a vector summation of electromagnetic fields arising from a combination of the currents and electrical currents flowing through the at least one coil mitigates the electromagnetic radiation emissions that do not contribute to wireless power transfer between the at least one electrically conductive coil and the electric vehicle.

17. The method of claim 15, wherein the one or more electrically insulating regions constrain the flow of the currents to be only in one or more predetermined directions.

18. The method of claim 15, wherein the one or more electrically insulating regions increase a first amount of currents flowing in a first electrically conducting region of the at least one shield structure as compared to a second amount of currents flowing in a second electrically conducting region of the at least one shield structure.

19. The method of claim 15, wherein the one or more electrically insulating regions allow some flow of the currents between the two electrically conducting regions on either side of the electrically insulating region.

20. The method of claim 15, wherein the one or more electrically insulating regions prevent flow of the currents between the two electrically conducting regions on either side of the electrically insulating region.

21. A method of mitigating electromagnetic radiation emissions from a wireless electric vehicle charging (WEVC) system, the method comprising:

wirelessly transferring energy, via a first power transfer device comprising a ferrite material, at least one electrically conductive coil, and at least one shield structure, the at least one shield structure positioned on a side of the ferrite material opposite the at least one electrically conductive coil and comprising a plurality of electrically conducting regions and one or more electrically insulating regions, wherein the one or more electrically insulating regions are located between two or more of the electrically conducting regions, and the energy wirelessly transferring from an electromagnetic field, the electromagnetic field comprising first electromagnetic radiation emissions and the electromagnetic field inducing currents in the at least one shield structure, the currents generating second electromagnetic radiation emissions;

wherein the plurality of electrically conducting regions and the one or more electrically insulating regions are arranged in a pattern that generates the second electromagnetic radiation emissions with an opposite phase from the first electromagnetic radiation emissions and substantially cancels at least a portion of the first electromagnetic radiation emissions that do not contribute to wireless energy transfer via the electromagnetic field and the first power transfer device.

22. The method of claim 21, wherein controlling currents comprises constraining the flow of the currents to be only in one or more predetermined directions.

* * * * *